US012160713B2

(12) United States Patent
LaBosco

(10) Patent No.: US 12,160,713 B2
(45) **Date of Patent: *Dec. 3, 2024**

(54) ROOM MONITOR USING CLOUD SERVICE

(71) Applicant: Crestron Electronics, Inc., Rockleigh, NJ (US)

(72) Inventor: Mark LaBosco, New City, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,612

(22) Filed: Jul. 10, 2023

(65) Prior Publication Data

US 2023/0353965 A1 Nov. 2, 2023

Related U.S. Application Data

(63) Continuation of application No. 17/569,327, filed on Jan. 5, 2022.

(60) Provisional application No. 63/135,186, filed on Jan. 8, 2021.

(51) Int. Cl.
*H04R 29/00* (2006.01)
*G10L 21/0208* (2013.01)
*G10L 25/84* (2013.01)

(52) U.S. Cl.
CPC ........ *H04R 29/001* (2013.01); *G10L 21/0208* (2013.01); *G10L 25/84* (2013.01); *H04R 29/004* (2013.01); *G10L 2021/02082* (2013.01)

(58) Field of Classification Search
CPC . H04R 29/001; H04R 29/004; G10L 21/0208; G10L 25/84; G10L 2021/02082
See application file for complete search history.

(56) References Cited

U.S. PATENT DOCUMENTS

| | | | | |
|---|---|---|---|---|
| 11,166,118 | B1 * | 11/2021 | Athayde | H04R 29/001 |
| 11,521,636 | B1 * | 12/2022 | Slotznick | G10L 21/0208 |
| 2004/0071084 | A1 | 4/2004 | El-Hennawey et al. | |
| 2005/0094795 | A1 * | 5/2005 | Rambo | H04M 9/10 379/202.01 |
| 2010/0232314 | A1 | 9/2010 | El-Hennawey et al. | |

(Continued)

FOREIGN PATENT DOCUMENTS

| | | | |
|---|---|---|---|
| CN | 114143668 A | * | 3/2022 |
| JP | 2014176043 A | * | 9/2014 |

*Primary Examiner* — David L Ton
(74) *Attorney, Agent, or Firm* — Mark W. Hrozenchik

(57) ABSTRACT

A system and method for performing sound quality testing of audio equipment in a conference room, the method comprising: determining, at a time t1, in a conference room with a set of audio video equipment, the set of audio equipment comprising one or more loudspeakers, one or more microphones, and audio signal processing equipment that includes at least an acoustic echo cancellation function, an initial audio performance level (IAPL) with the acoustic echo cancellation function turned off, and storing the same; determining, at a second time t2, following the first point in time t1, a current audio performance level (CAPL) with the acoustic echo cancellation function turned off, and storing the same; comparing the CAPL to the IAPL; and determining if the audio equipment in the conference room passes or fails the sound quality test based on the comparison of the CAPL to the IAPL.

30 Claims, 6 Drawing Sheets

(56) References Cited

U.S. PATENT DOCUMENTS

| | | | | |
|---|---|---|---|---|
| 2014/0064137 | A1 | 3/2014 | El-Hennawey et al. | |
| 2015/0296085 | A1 * | 10/2015 | Peeler | H04R 27/00 381/77 |
| 2017/0249939 | A1 * | 8/2017 | Brooks | G10L 15/24 |
| 2021/0014608 | A1 * | 1/2021 | Sakuraba | H04R 3/02 |
| 2021/0250009 | A1 * | 8/2021 | Veselinovic | H04S 7/301 |
| 2022/0086579 | A1 * | 3/2022 | Holstrom | H04R 29/005 |
| 2022/0232336 | A1 * | 7/2022 | Goff | G10L 21/0232 |
| 2022/0386025 | A1 * | 12/2022 | Moles | H04R 3/005 |
| 2022/0415299 | A1 * | 12/2022 | Ferguson | H04M 9/082 |
| 2023/0079741 | A1 * | 3/2023 | Snook | H04R 1/403 381/59 |

* cited by examiner

ROOM MONITOR USING CLOUD SERVICE

PRIORITY INFORMATION

The present application claims priority under 35 U.S.C. § 120 as a continuation application to U.S. Non-Provisional patent application Ser. No. 17/569,327, filed Jan. 5, 2022 and the present application also claims priority under 35 U.S.C. § 119(e) to U.S. Provisional Patent Application Ser. No. 63/135,186, filed Jan. 8, 2021, the entire contents of both of which are expressly incorporated herein by reference.

BACKGROUND OF THE INVENTION

Technical Field

Aspects of the embodiments relate generally to monitoring of electronic equipment in conference rooms, and more specifically to systems, methods, and modes for a cloud based monitoring service for network-connected equipment in a conference room.

Background Art

During the current coronavirus pandemic emergency, the use of conference rooms has decreased dramatically in some cases (e.g., corporations), but has increased in others (schools, hospitals, government, and local and national emergency services). As such, it is the case that the conference room equipment maintain peak performance at substantially all times—emergency group decisions may need to be made in shortened time spans to deal with and confront the pandemic, and equally important our children need to maintain a sense of connectedness while performing distant learning activities.

It is the case, though, that over time, or between important conference call meetings, room changes, small or large, can occur that can contribute to variances in call quality and drift in system performance. A solution is required to test microphones (Mics), digital signal processors (DSPs), amplifiers, and loudspeakers and indicate if system changes are impacting the user experience. For example, table boundary microphones can be moved for a local meeting and returned to new locations for a subsequent teleconference session, changing voice pickup characteristics and acoustic echo cancellation (AEC) effectiveness. Another common problem is that in-room playback levels can be adjusted up for a soft talker on the far end that increases background noise and will have a negative impact on AEC performance in subsequent calls with loud talkers. A system that can perform a basic user controls reset and diagnostic test to flag any changes or issues is needed. A prompt for service to ensure best performance will improve the overall customer experience.

Accordingly, a need has arisen for systems, methods, and modes for a cloud based monitoring service for network-connected equipment in a conference room.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a cloud based monitoring service for network-connected equipment in a conference room that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a computer-implemented method for performing sound quality testing of audio equipment in a conference room is provided, the method executed by one or more processors, comprising: (a) commissioning the conference room with a set of audio video equipment, the set of audio equipment comprising one or more loudspeakers, one or more microphones, and audio signal processing equipment that includes at least an acoustic echo cancellation function; (b) determining an initial audio performance level in the conference room, and storing the initial audio performance level (IAPL); (c) determining that sound quality testing of the audio equipment in the conference room should be performed; (d) disabling the acoustic echo cancellation function in the audio equipment of the conference room such that an output from each of the one or more loudspeakers is not removed from a respective microphone output signal; (e) generating an electrical stimulus test signal and transmitting it to the one or more loudspeakers in the audio equipment of the conference room; (f) receiving an acoustic audio stimulus test signal generated by each of the one or more loudspeakers from each of the one or more microphones, and analyzing each of the received acoustic audio stimulus test signals to generate a current audio performance level (CAPL); (g) comparing the CAPL to the IAPL; and (h) determining if the audio equipment in the conference room passes or fails the sound quality test based on the comparison of the CAPL to the IAPL.

According to the first aspect of the embodiments, the method further comprises: (i) performing one or more microphone and/or loudspeaker failure mode diagnostic checks if the audio equipment fails the sound quality test to determine if one or more microphones has degraded in performance, one or more loudspeakers has degraded in performance, or whether one or more of both microphones and loudspeakers has degraded in performance.

According to the first aspect of the embodiments, the method further comprises: performing steps (d)-(i) until the comparison of the CAPL and IAPL indicates a pass of the sound quality test.

According to the first aspect of the embodiments, the step of performing one or more microphone and/or loudspeaker failure more diagnostic checks comprises: determining that one or more of the one or more microphones were moved, damaged and/or covered in regard to initial commissioning, and/or determining that one or more of the one or more loudspeakers were damaged in regard to the initial commissioning.

According to the first aspect of the embodiments, the step of determining that one or more of the one or more microphones were moved in regard to initial commissioning comprises: determining a relative output level of the microphone, such that a decreased relative output level of the microphone indicates movement away from the one or more loudspeakers, and an increased relative output level indicates movement towards the one or more loudspeakers.

According to the first aspect of the embodiments, the step of determining that one or more of the one or more microphones were moved in regard to initial commissioning comprises: using time domain measurements to measure delay between each of the one or more loudspeakers and each of the one or more microphones.

According to the first aspect of the embodiments, the time domain measurement comprises: transmitting an acoustic test signal from each of at least three loudspeakers one at a time to at least one microphone under test, noting a start time of transmission from each of the at least three loudspeakers, a corresponding receive time at the microphone under test, and determining a position according to the equation $r=v \times t$, wherein r=radius from a respective loudspeaker, v=a velocity of sound, and t=a time of transmission of the acoustic test signal, and further wherein an intersection of the three radii can be determined to ascertain a relative location of the microphone under test relative to the at least three loudspeakers.

According to the first aspect of the embodiments, the method further comprises: (h) enabling the acoustic echo cancellation function in the audio equipment in the conference room if the comparison between the CAPL and IAPL indicates a pass of the sound quality test; and performing steps (d)-(h) until a subsequent comparison of the CAPL and IAPL indicates a pass of the sound quality test, wherein the audio equipment is determined to be performing at or above the IAPL.

According to the first aspect of the embodiments, the electrical stimulus test signal consists of at least one of a frequency sweep signal a pink noise signal, a voice recording, or any combination of a frequency sweep signal a pink noise signal, and a voice recording.

According to the first aspect of the embodiments, the step of analyzing consists of one or more of (a) determining quantitative values of the received acoustic audio stimulus test signals from each of the one or more microphones, wherein such quantitative values can include signal levels in decibels (dB) or percentage, or total harmonic distortion (THD) in dB or percentage, or (b) determining time domain or frequency domain plots of the received acoustic audio stimulus test signals from each of the one or more microphones.

According to the first aspect of the embodiments, the step of determining if the audio equipment in the conference room passes or fails the sound quality test based on the comparison of the CAPL to the IAPL comprises: passing the sound quality test if the CAPL is the same or better than the IAPL.

According to the first aspect of the embodiments, the step of determining if the audio equipment in the conference room passes or fails the sound quality test based on the comparison of the CAPL to the IAPL comprises: passing the sound quality test if the CAPL is within a first tolerance level of the IAPL.

According to the first aspect of the embodiments, the step of determining an IAPL comprises: installing the audio equipment in the conference room; tuning the audio equipment in the conference room; disabling the acoustic echo cancellation function in the audio equipment of the conference room such that an output from each of the one or more loudspeakers is not removed from a respective microphone output signal; generating an electrical stimulus test signal and transmitting it to the one or more loudspeakers in the audio equipment of the conference room; receiving an acoustic audio stimulus test signal generated by each of the one or more loudspeakers from each of the one or more microphones, and analyzing each of the received acoustic audio stimulus test signals to generate the initial audio performance level (IAPL).

According to a second aspect of the embodiments, a system for performing sound quality testing of audio equipment in a conference room is provided, comprising: a set of audio equipment located in a conference room, the set of audio equipment comprising one or more loudspeakers, one or more microphones, and audio signal processing equipment that includes at least an acoustic echo cancellation function, and wherein the audio signal processing equipment is adapted to communicate via a network interface; at least one processor communicatively coupled to the audio signal processing equipment via the network interface; and a memory operatively connected with the at least one processor, wherein the memory stores computer-executable instructions that, when executed by the at least one processor, causes the at least one processor to execute a method that comprises: (a) determining an initial audio performance level (IAPL) in the conference room, and storing the initial audio performance level; (b) determining that sound quality testing of the audio equipment in the conference room should be performed; (c) disabling the acoustic echo cancellation function in the audio equipment of the conference room such that an output from each of the one or more loudspeakers is not removed from a respective microphone output signal; (d) generating an electrical stimulus test signal and transmitting it to the one or more loudspeakers in the audio equipment of the conference room; (e) receiving an acoustic audio stimulus test signal generated by each of the one or more loudspeakers from each of the one or more microphones, analyzing each of the received acoustic audio stimulus test signals to generate a current audio performance level (CAPL); (f) comparing the CAPL to the IAPL; and (g) determining if the audio equipment in the conference room passes or fails the sound quality test based on the comparison of the CAPL to the IAPL.

According to the second aspect of the embodiments, the method executed by the processor further comprises: (h) performing one or more microphone and/or loudspeaker failure mode diagnostic checks if the audio equipment fails the sound quality test to determine if one or more microphones has degraded in performance, one or more loudspeakers has degraded in performance, or whether one or more of both microphones and loudspeakers has degraded in performance.

According to the second aspect of the embodiments, the method executed by the processor further comprises: performing steps (c)-(h) until the comparison of the CAPL and IAPL indicates a pass of the sound quality test.

According to the second aspect of the embodiments, the step of performing one or more microphone and/or loudspeaker failure more diagnostic checks comprises: determining that one or more of the one or more microphones were moved, damaged and/or covered in regard to initial commissioning, and/or determining that one or more of the one or more loudspeakers were damaged in regard to the initial commissioning.

According to the second aspect of the embodiments, the step of determining that one or more of the one or more microphones were moved in regard to initial commissioning comprises: determining a relative output level of the microphone, such that a decreased relative output level of the microphone indicates movement away from the one or more loudspeakers, and an increased relative output level indicates movement towards the one or more loudspeakers.

According to the second aspect of the embodiments, the step of determining that one or more of the one or more microphones were moved in regard to initial commissioning comprises: using time domain measurements to measure delay between each of the one or more loudspeakers and each of the one or more microphones.

According to the second aspect of the embodiments, the time domain measurement comprises: transmitting an acoustic test signal from each of at least three loudspeakers one at a time to at least one microphone under test, noting a start time of transmission from each of the at least three loudspeakers, a corresponding receive time at the microphone under test, and determining a position according to the equation $r=v \times t$, wherein r=radius from a respective loudspeaker, v=a velocity of sound, and t=a time of transmission of the acoustic test signal, and further wherein an intersection of the three radii can be determined to ascertain a relative location of the microphone under test relative to the at least three loudspeakers.

According to the second aspect of the embodiments, the method executed by the processor further comprises: (h) enabling the acoustic echo cancellation function in the audio equipment in the conference room if the comparison between the CAPL and IAPL indicates a pass of the sound quality test; and performing steps (d)-(h) until a subsequent comparison of the CAPL and IAPL indicates a pass of the sound quality test, wherein the audio equipment is determined to be performing at or above the IAPL.

According to the second aspect of the embodiments, the electrical stimulus test signal consists of at least one of a frequency sweep signal a pink noise signal, a voice recording, or any combination of a frequency sweep signal a pink noise signal, and a voice recording.

According to the second aspect of the embodiments, the step of analyzing consists of one or more of (a) determining quantitative values of the received acoustic audio stimulus test signals from each of the one or more microphones, wherein such quantitative values can include signal levels in decibels (dB) or percentage, or total harmonic distortion (THD) in dB or percentage, or (b) determining time domain or frequency domain plots of the received acoustic audio stimulus test signals from each of the one or more microphones.

According to the second aspect of the embodiments, the step of determining if the audio equipment in the conference room passes or fails the sound quality test based on the comparison of the CAPL to the IAPL comprises: passing the sound quality test if the CAPL is the same or better than the IAPL.

According to the second aspect of the embodiments, the step of determining if the audio equipment in the conference room passes or fails the sound quality test based on the comparison of the CAPL to the IAPL comprises: passing the sound quality test if the CAPL is within a first tolerance level of the IAPL.

According to the second aspect of the embodiments, the step of determining an IAPL comprises: installing the audio equipment in the conference room; tuning the audio equipment in the conference room; disabling the acoustic echo cancellation function in the audio equipment of the conference room such that an output from each of the one or more loudspeakers is not removed from a respective microphone output signal; generating an electrical stimulus test signal and transmitting it to the one or more loudspeakers in the audio equipment of the conference room; receiving an acoustic audio stimulus test signal generated by each of the one or more loudspeakers from each of the one or more microphones, and analyzing each of the received acoustic audio stimulus test signals to generate the initial audio performance level (IAPL).

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION OF THE INVENTION

Figure 1:
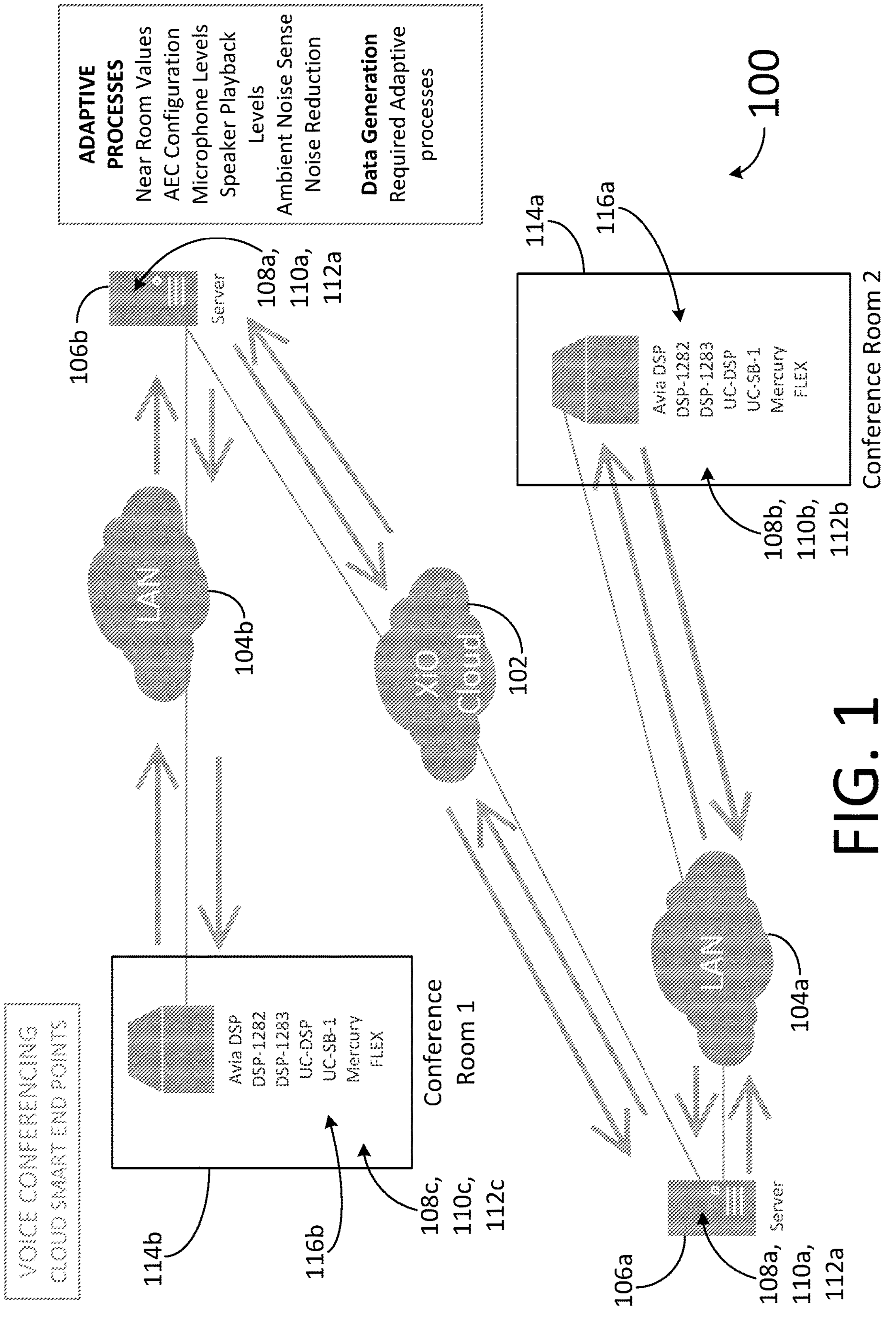
FIG. 1 illustrates a block diagram of at least two networked conference rooms that can use a conference room monitor and diagnostic system and method for ascertaining a quality of service level of an audio path through the network, wherein the network can include use of a cloud based service referred to as "XiO Cloud," and wherein the quality of service level verifies the integrity of the audio path between the plurality of networked conference rooms.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such a cloud based monitoring service for network-connected equipment in a conference room.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

The different aspects of the embodiments described herein pertain to the context of a cloud based monitoring service that includes one or more computer based testing and monitoring applications for network-connected equipment in a conference room, but is not limited thereto, except as may be set forth expressly in the appended claims. According to aspects of the embodiments, an application (or a hosted service) can provide cloud based testing and monitoring service for network-connected equipment in a conference room.

For 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as an XiO cloud based monitoring service for network-connected equipment in a conference room can be manufactured by Crestron Electronics Inc., located in Rockleigh, NJ.

The following is a list of elements used in the aspects of the embodiments, in numerical order.

100 Network
102 Cloud Services/Devices (e.g., Crestron's XiO)
104 Local Area Network (LAN) Services/Devices
106 Server
108 Processor
110 Memory
112 Room Monitor Application (App)
114 Conference Room.
116 Audio Equipment
200 Start View Graphical User Interface (GUI)
202 Select Local Conference Room GUI
204 Initial Diagnostic Evaluation Buttons
206 Updated Diagnostic Evaluation Buttons
208 Select Distant Conference Room GUI
210 Set QoS Level GUI
212 GUI Control Buttons
214 Desktop Work Area
300 Method for Evaluating Audio Performance of a Conference Room Under Test (CRUT)
302-316 Method Steps of Method 300
401 Shell/Box
402 Integrated Display/Touch-Screen (laptop/tablet etc.)
404 Internal Data/Command Bus (Bus)
406 Processor Internal Memory
408 Processor(s)
410 Universal Serial Bus (USB) Port
411 Ethernet Port
412 Compact Disk (CD)/Digital Video Disk (DVD) Read/Write (RW) (CD/DVD/RW) Drive
414 Floppy Diskette Drive
416 Hard Disk Drive (HDD)
418 Read-Only Memory (ROM)
420 Random Access Memory (RAM)
422 Video Graphics Array (VGA) Port or High Definition Multimedia Interface (HDMI)
424 External Memory Storage Device
426 External Display/Touch-Screen
428 Keyboard
430 Mouse
432 Processor Board/PC Internal Memory (Internal Memory)
434 Flash Drive Memory
436 CD/DVD Diskettes
438 Floppy Diskettes
112 Executable Software Programming Code/Application (Room Monitor Application)
442 Wi-Fi Transceiver
444 BlueTooth (BT) Transceiver
446 Near Field Communications (NFC) Transceiver
448 Third Generation (3G), Fourth Generation (4G), Fifth Generation (5G), Long Term Evolution (LTE) (3G/4G/LTE) Transceiver
450 Communications Satellite/Global Positioning System (Satellite) Transceiver Device
452 Antenna
454 Internet
456 Universal Serial Bus (USB) Cable
458 Ethernet Cable (CATS)
460 Scanner/Printer/Fax Machine
500 Network System
502 Mobile Device
504 Personal Computer (PC)
506 Internet Service Provider (ISP)
508 Modulator/Demodulator (modem)
510 Wireless Router
512 Plain Old Telephone Service (POTS) Provider
514 Cellular Service Provider
518 Communications Satellite
520 Cellular Tower
522 Internet
524 Global Positioning System (GPS) Station
526 Satellite Communication Systems Control Stations
528 GPS Satellite The following is a list of acronyms used herein in alphabetical order.

3G Third Generation
4G Fourth Generation
5G Fifth Generation
AEC Acoustic Echo Cancellation
API Application Programming Interface
App Application
ASIC Application Specific Integrated Circuitry
BIOS Basic Input/Output System BT Bluetooth
CAPL Current Audio Performance Level
CD Compact Disk
CRT Cathode Ray Tubes
CRUT Conference Room Under Test
dB Decibels
DSP Digital Signal Processor
DVD Digital Video/Versatile Disk
EEPROM Electrically Erasable Programmable Read Only Memory
FPGA Field Programmable Gate Array Structures
GAN Global Area Network
GPS Global Positioning System
GUI Graphical User Interface
HDD Hard Disk Drive
HDMI High Definition Multimedia Interface
IAPL Initial Audio Performance Level
ISP Internet Service Provider
LAN Local Area Network
LCD Liquid Crystal Display
LED Light Emitting Diode Display
LTE Long Term Evolution
Mic Microphone
MODEM Modulator-Demodulator
NFC Near Field Communication
PC Personal Computer
POTS plain old telephone service
QoE Quality of Experience
QoS Quality of Service
RAM Random Access Memory
ROM Read Only Memory
RW Read/Write
SPL Sound Pressure Level
THD Total Harmonic Distortion
USB Universal Serial Bus
UVPROM Ultra-violet Erasable Programmable Read Only Memory
VGA Video Graphics Array According to aspects of the embodiments, a basic test routine can confirm that the initial performance measured during system commissioning holds and the quality of experience is maintained. According to aspects of the embodiments, systems and methods can be provided to test Mics, DSP, Amplifiers and Loudspeakers and indicate if system changes are impacting the user experience. For example, table boundary microphones can be moved for a local meeting and returned to new locations for a subsequent teleconference session, changing voice pickup characteristics and AEC effectiveness. Another common problem is that in-room playback levels are adjusted up for a soft talker on the far end that increases background noise and will have a negative impact on AEC performance in subsequent calls with loud talkers. Systems, methods, and modes can be provided that can perform a basic user controls reset and diagnostic test to flag any changes or issues. According to aspects of the embodiments, such a system and method can be referred to as a Conference Room Monitor and Diagnostic System and Service (herein after referred to as "Room Monitor System and Service").

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those of skill in the art can appreciate that different aspects of the embodiments can be practiced with other computer system configurations, including hand-held devices, multiprocessor systems, microprocessor-based or programmable consumer electronics, minicomputers, mainframe computers, and comparable computing devices. Aspects of the embodiments can also be practiced in distributed computing environments where tasks are performed by remote processing devices that are linked through a communications network. In a distributed computing environment, program modules can be located in both local and remote memory storage devices.

Aspects of the embodiments can be implemented as a computer-implemented process (method), a computing system, or as an article of manufacture, such as a computer program product or computer readable media. The computer program product can be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" can be a combination of software and hardware components for providing share permissions and organization of content in an application with multiple levels of organizational hierarchy. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory can be a removable or non-removable component of a computing device configured to store one or more instructions to be executed by one or more processors. A processor can be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience can be embodied as a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) can be a set of routines, protocols, and tools for an application or service that allow the application or service to interact or communicate with one or more other applications and services managed by separate entities.

While example implementations are described using computer or server applications herein, embodiments are not limited to a server application. Technical advantages exist for testing and calibrating networked conference room equipment using utilizing the aspects of the embodiments. Such technical advantages can include, but are not limited to, include determining a baseline acoustic signature of a conference room, real-time and consistent monitoring of deviations from such baseline acoustic signatures of the conference room, and providing notifications that such deviations exist to one or more personnel. These technical advantages are substantially difficult, if not impossible, to replicate manually as they involve network conference rooms that can include several if not dozens of pieces of equipment at different conference rooms, and the cloud, which can encompass hundreds if not thousands or tens of thousands of miles of communications channels, over one or more telecommunications providers.

Aspects of the embodiments address a need that arises from very large scale of operations created by networked computing and cloud-based services that cannot be managed by humans. The actions/operations described herein are not a mere use of a computer, but address results of a system that is a direct consequence of software used as a service such as communication services offered in conjunction with communications.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art can appreciate that aspects of the embodiments can be practiced with other computer system configurations, including hand-held devices, multiprocessor systems, microprocessor-based or programmable consumer electronics, minicomputers, mainframe computers, and comparable computing devices. Aspects of the embodiments can also be practiced in distributed computing environments where tasks are performed by remote processing devices that are linked through a communications network. In a distributed computing environment, program modules can be located in both local and remote memory storage devices.

Some aspects of the embodiments can be implemented as a computer-implemented process (method), a computing system, or as an article of manufacture, such as a computer program product or computer readable media. The computer program product can be a computer storage medium readable by a computer system and encoding a computer program that comprises instructions for causing a computer or computing system to perform example process(es). The computer-readable storage medium is a computer-readable memory device. The computer-readable storage medium can, for example, be implemented via one or more of a volatile computer memory, a non-volatile memory, a hard drive, a flash drive, a floppy disk, or a compact disk, and comparable hardware media, among other types of storage media.

Throughout this specification, the term "platform" can be a combination of software and hardware components for providing systems, methods, and modes for a computer-based dynamic content generation application that facilitates document creation through the substantially seamless synthesis of information from multiple reference files and file types to edit text/content within one integrated space. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory can be a removable or non-removable component of a computing device adapted to store one or more instructions to be executed by one or more processors. A processor can be a component of a computing device coupled to a memory and adapted to execute programs in conjunction with instructions stored by the memory. Actions or operations described herein can be executed on a single processor, on multiple processors (in a single machine or distributed over multiple machines), or on one or more cores of a multi-core processor. An operating system can be a system adapted to manage hardware and software components of a computing device that provides common services and applications. An integrated module can be a component of an application or service that can be integrated within the application or service such that the application or service can be adapted to execute the component. A computer-readable memory device can be a physical computer-readable storage medium implemented via one or more of a volatile computer memory, a non-volatile memory, a hard drive, a flash drive, a floppy disk, or a compact disk, and comparable hardware media that includes instructions thereon to substantially automatically save content to a location. A user experience can be a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input, among other types of inputs. An API can be a set of routines, protocols, and tools for an application or service that allow the application or service to interact or communicate with one or more other applications and services managed by separate entities.

Figure 2:
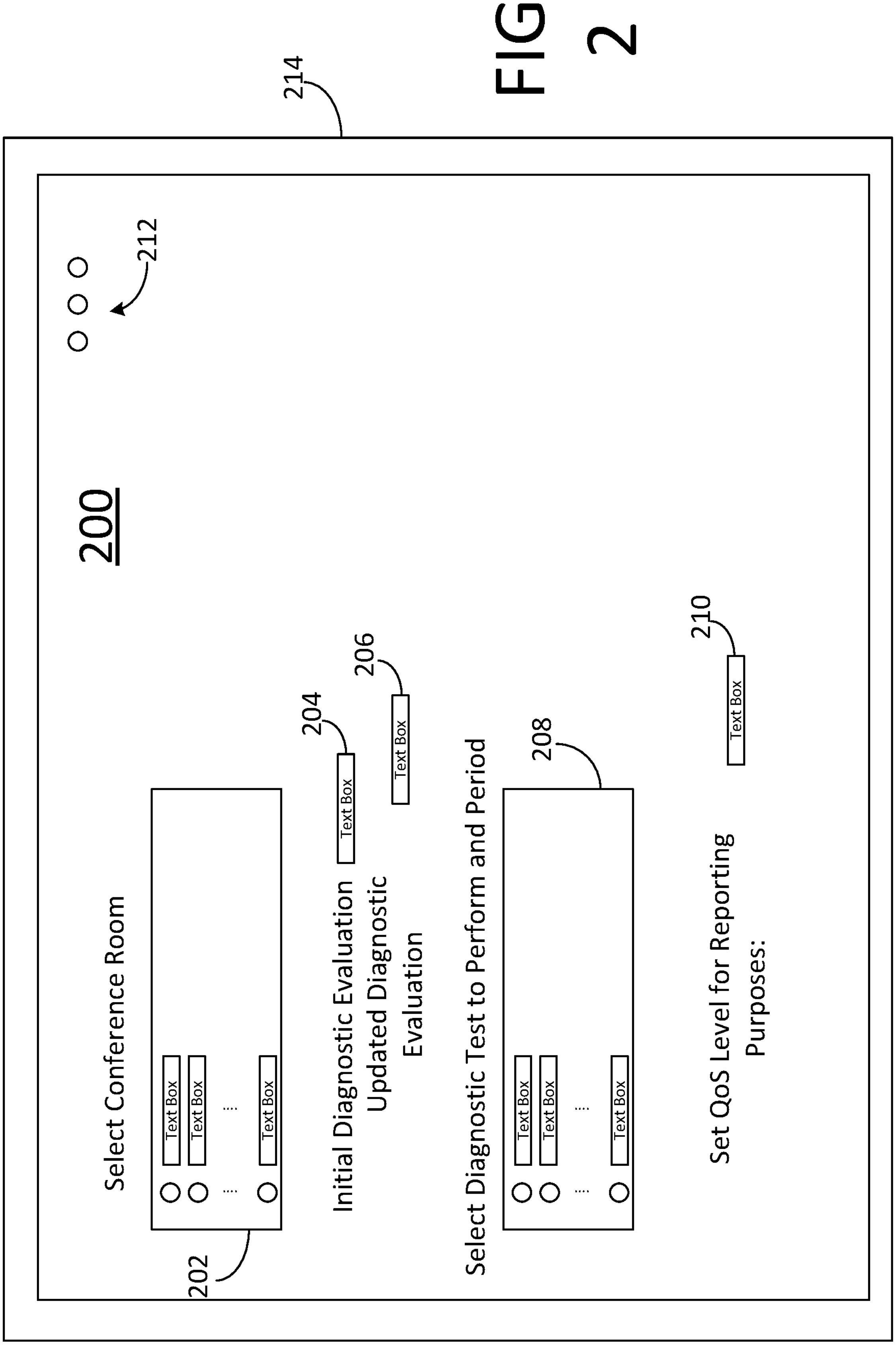
FIG. 2 illustrates a graphical user interface on a desktop work area of a server representing a start or opening graphical user interface view when a user first uses or opens a room monitor application in computing network environment according to aspects of the embodiments.

FIGS. 1-2 illustrate various aspects of a cloud based monitoring service for network-connected equipment in a conference room program or application for use on one or more computing devices, including, according to certain aspects of the embodiments, use of the internet or other similar networks. The room monitoring program provides a practical, technical solution to the problem of providing a cloud based monitoring service for network-connected equipment in a conference room; as those of skill in the art can appreciate, the aspects of the embodiments have no "analog equivalent" as its embodiments reside solely or substantially in the physical device or computer domain. That is, performing equipment monitoring on equipment that is spread out over thousands of miles and interconnected by one or more telecommunications companies, always meant, and continues to mean, using practical, non-abstract physical devices. The technological improvement of the aspects of the embodiments resides in at least in the ability to quickly and easily monitor and test equipment that is geographically spread out. In addition, such aspects of the embodiments have no "analog equivalents" because the algorithm not only performs the monitoring and testing automatically, but it represents the data and results in a manner that can only be done on a computer, and it allows a user to manipulate the relevant data and results using many different types of commands none of which could be accomplished without a computer or some other technological equivalent.

FIG. 1 illustrates a conceptual, non-limiting, block diagram of computing network environment 100 for monitoring and diagnosing an audio path and audio equipment in one or more network interconnected conference rooms according to aspects of the embodiments. In FIG. 1, a conference room monitor, and diagnostic system and method can ascertain a quality of service level of an audio path through the network, wherein the network can include use of a cloud based service referred to as "XiO Cloud," and wherein the quality of service level verifies the integrity of the audio path between the plurality of networked conference rooms.

Figure 3:
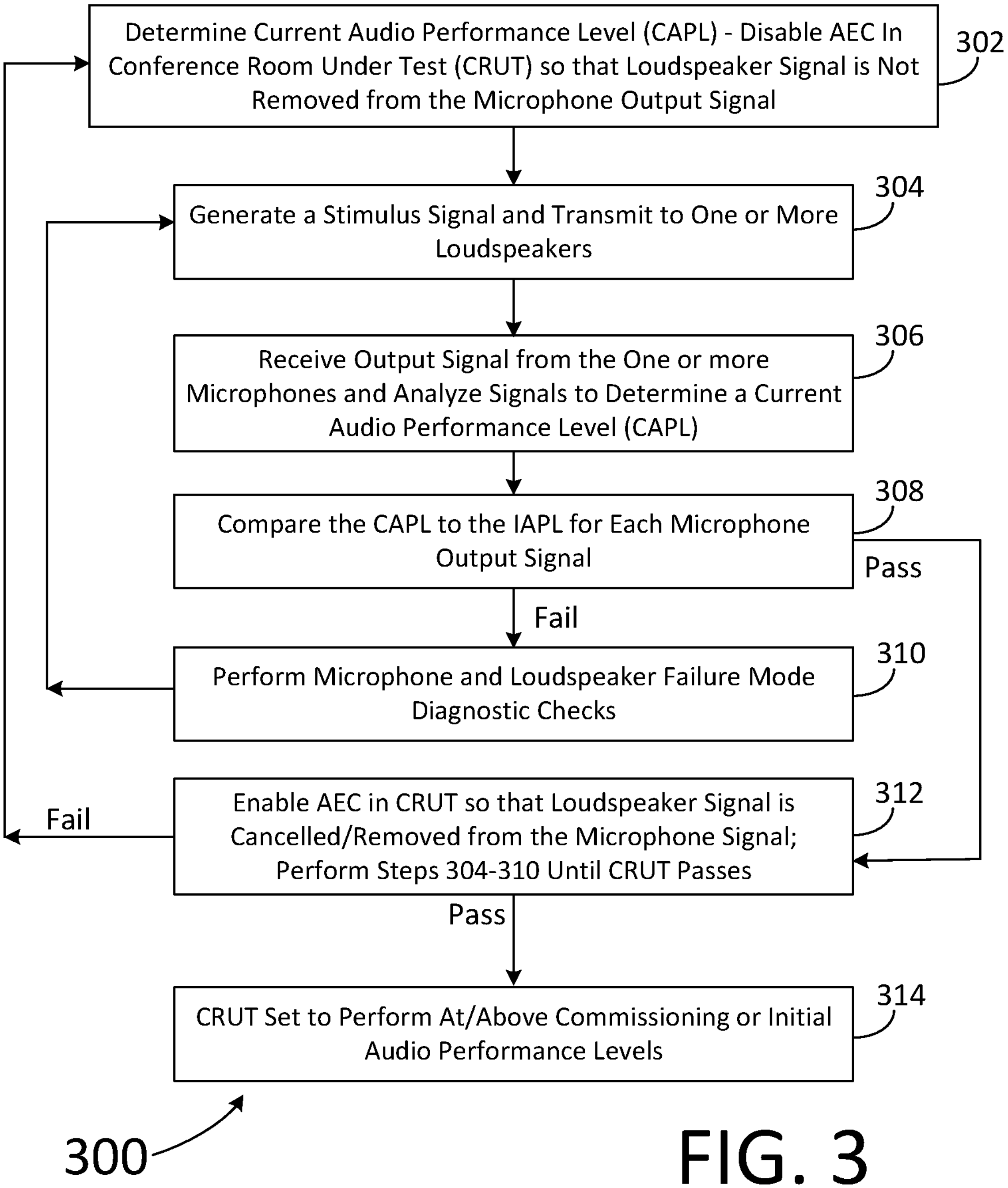
FIG. 3 illustrates a flow chart of a method for performing testing of audio equipment located in a conference room according to aspects of the embodiments.

As shown in FIG. 1, room monitor application (App) server host (room monitor App server) 106*a,b* can execute room monitoring application (room monitor App) 112 that provides the capability to monitor and diagnose audio equipment and the audio path as shown in FIG. 1. Computing network environment 100 can also include local area networks 104*a,b* that can connect audio equipment 116*a,b*, in each of conference rooms 114*a,b*, respectively, to each other through cloud 102 (e.g., XiO cloud 102). Each of servers 106*a,b* comprise processor 108, and memory 110 in which is stored room monitor App 112 according to aspects of the embodiments. According to further aspects of the embodiments, room monitor App 112 can also be stored in one or more of the components of audio equipment 116; for example, audio equipment 116 can include one or more of network transceivers, amplifiers, digital signal processors (DSPs), and the like. Accordingly, each of audio equipment 114 includes processor 108, memory 110, and room monitor App 112. Room monitor App 112 can be stored in the DSP to interface with a remotely or locally located user of room monitor App 112 to perform testing of audio equipment 116 in the manner described below, especially in regard to method 300 as shown in FIG. 3, and described herein.

Users can access room monitor App 112*a,b* in respective servers 106*a,b*. As those of skill in the art can appreciate, room monitor App 112 can be embodied as either a sold or licensed stand-alone software product, or it can be sold or licensed and embodied in the form as shown in FIG. 1, that is, stored in memory 110 on servers 106.

Cloud 102 can be one or more different or separate networks, and can provide wired or wireless communications between nodes, such as servers 106*a,b*. According to aspects of the embodiments, room monitor App 112 can also be locally executed on a user's computing device e.g., a personal electronic device (not shown in the Figures). To monitor and diagnose audio equipment 116, room monitor App 112 can provide a user experience to the users. The user experience can be a visual display through which the users can interact with room monitor App 112. The interactions can include a touch input, a gesture input, a voice command, eye tracking, a gyroscopic input, a pen input, mouse input, and/or a keyboards input, among others.

Servers 106*a,b* can each include a display device, such as a touch enabled display component, and a monitor, among others, to provide access to room monitor App 112 for the users through a web browser (thin client) or a local client application (thick client). Further, servers 106*a,b* can include a desktop computer, a laptop computer, a tablet, a handheld device, a vehicle mount computer, an embedded computer system, a smart phone, and a wearable computer, among other computing devices, for example.

While computing network environment 100 as illustrated in FIG. 1 has been described with specific components including servers 106*a,b*, cloud 102, and room monitor App 112, aspects of the embodiments are not limited to these components or system configurations and can be implemented with other system configuration employing fewer or additional components.

FIG. 2 illustrates a graphical user interface (GUI) on desktop work area 214 of server 106 representing a start or opening graphical user interface view (start view GUI 200) when a user first uses or opens room monitor App 112 in computing network environment 100 according to aspects of the embodiments. Start view GUI 200 is displayed on desktop work area 210 that is displayed on the monitor/display associated with server 106. In several of the following Figures, desktop work area 214 has been omitted in fulfillment of the dual purposes of clarity and brevity, although those of skill in the art can appreciate that desktop work area can be part of any computer operated application, software, or program, which requires or involves input/interface with a user. Further, additional GUIs have been omitted from herein in fulfillment of the dual purposes of clarity and brevity, as the aspects of the embodiments can be readily understood by those of skill in the art without the additional GUIs.

Upon logging in, the user will be taken to start view GUI 200. Several GUI buttons exist in start view GUI 200; as those of skill in the art can appreciate, "buttons" are GUI's areas defined within the window view that a user can interact with to perform different functions. Several of the buttons shown in start view GUI 200 are known to those of skill in the art, and therefore, a detailed discussion of how they operate is both not needed to understand the aspects of the embodiments, and beyond the scope of this discussion, and therefore, in fulfillment of the dual purposes of clarity and brevity, a detailed discussion of their operation has been omitted here-from. In addition, the term "clicks on" is used through out this discussion and is known to those of skill in the art, and therefore, in fulfillment of the dual purposes of clarity and brevity, a detailed discussion has been omitted here-from.

Shown in FIG. 2 are Select Conference Room GUI 202 (from hereon in, reference to any GUI button shall omit the nomenclature "GUI" as such is presumed to be the manner in which the button or toolbar or sub-window operates, unless otherwise described), Initial Diagnostic Evaluation button 204, Updated Diagnostic Evaluation button 206, Select Diagnostic Testing Period window 208, and Set QoS Level for Reporting Purposes window 210. Also shown in FIG. 2 are a plurality of window manipulation buttons 212 that represent known window GUI functions, such as minimize, maximize, close, among other types.

If a user clicks on any one of the buttons in window 202, room monitor App 112 finds in memory all the information needed to communicate with all of the equipment in the selected conference room, and prepares to run one or more diagnostic tests. While there can be only one type of "diagnostic" test, there are at least several methods in which the test can be used. For example, the user can simply run a diagnostic test on the equipment in the selected conference room alone; in addition, such test can be an initial test or an updated diagnostic test. Or, the user can select a distant conference room and run the diagnostic test, as an initial test, or an updated test. Or, if the use selects both at least two different conference rooms, room monitor App 112 will run the diagnostic test on both sets of equipment, as well as the network/cloud between the two conference rooms; such testing is not limited to two rooms—any number of conference rooms can be so tested. local and one distant conference room.

Further, room monitor App 112 can periodically run the diagnostic test on any conference room it has access too. The period of such testing can be selected in Select Diagnostic Testing Period window 208, and the QoS level threshold for reporting can be set in window 210. For example, if a testing period of once per day were selected, room monitor App 112 would run a diagnostic test each day on any conference room it has access too, include network and cloud paths, and if the QoS level ever falls below the level set by the user in window 210, room monitor App 112 can generate a report. Those of skill in the art can appreciate that the features of testing described above are exemplary only, and not to be taken in a limiting manner; many other variations of testing, monitoring, reporting, and data gathering are available through use of room monitor App 112 according to aspects of the embodiments.

According to aspects of the embodiments, the systems and methods described herein can be used with one or more loudspeakers to test one or more microphones in a conference room under test (CRUT) 114 to determine how well the components are performing compared to stored reference measurements (i.e., the "commissioning" measurements).

According to aspects of the embodiments, the loudspeakers can be located in fixed locations (ceiling or wall mount), and the microphones are free to move. According to further aspects of the embodiments, the microphones can be fixed in location, or one or more can be fixed, and one or more can be movable.

Figure 6:
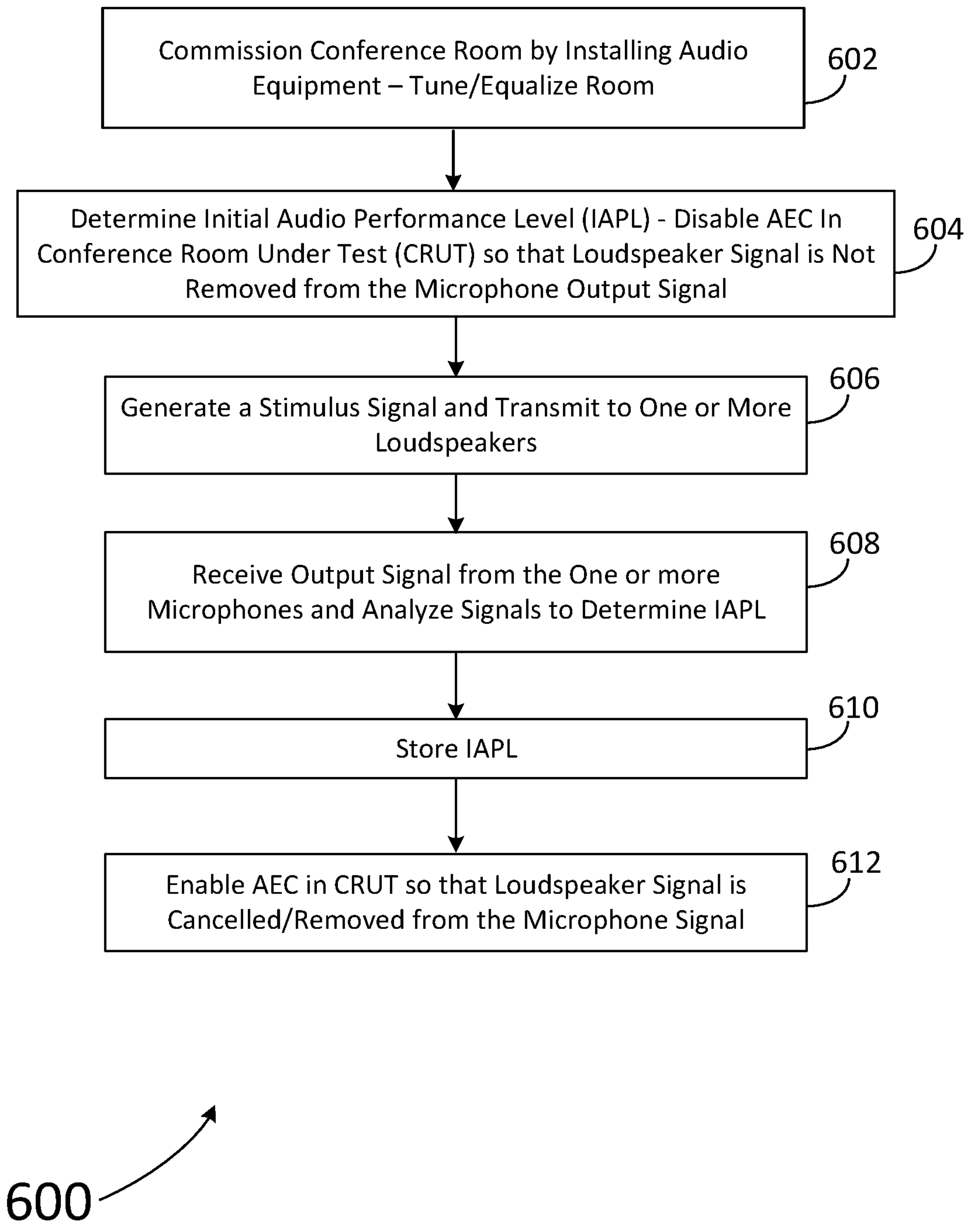
FIG. 6 illustrates a flow chart of a method for commissioning audio equipment just after it has been installed in a conference room and tuned/equalized according to aspects of the embodiments.

Attention is now directed to FIG. 6, which illustrates a flow chart of method 600 for commissioning audio equipment just after it has been installed in a conference room and tuned/equalized according to aspects of the embodiments.

Conference room audio equipment commissioning method 600 (method 600) begins with method step 602 in which conference room 114 is commissioned and a commission or initial audio performance level (IAPL) of the installed audio equipment is determined/ascertained by one or more audio equipment tests. Such audio equipment tests can determine quantitative values such as, for example signal level in decibels (dB), total harmonic distortion (THD) in dB, or percent, among other criteria, or calculating time domain or frequency domain plots from the signals to generate a frequency response or a rub/buzz masks.

In method step 602, conference room 114 is commissioned—that is, audio equipment is installed, tuned, and equalized. Those of skill in the art can appreciate that "tuning and equalizing" the audio equipment in a conference room can take some time, skill level, and experience such that a substantially flat frequency response is achieved, as well as substantially uniform audio signal coverage throughout the usable area of the conference room. In method step 604, method 600 determines an initial audio performance level of the audio equipment in conference room 114 (which shall be from hereon in referred to as "conference room under test" (CRUT) 114. Method 600 begins the process of determining an IAPL by disabling the acoustic echo cancellation function in the audio equipment installed in CRUT 114, so that any loudspeaker output signals are not removed from the microphone output signal.

Next, in method step 606, a stimulus signal is generated by the DSP or some other device, and transmitted to the one or more loudspeakers individually, in a predetermined sequence. The stimulus signal can be one or more of a frequency sweep signal, a pink noise signal, a voice recording, or the like, among others. More than one type of stimulus signal can be used.

In method step 608, the loudspeaker acoustic output signal is received at each of one or more microphones, and the output from each microphone is analyzed. Such analysis can include, but is not limited to one or more attributes such as signal level, frequency response, distortion, rub and buzz, among others. As those of skill in the art can appreciate, rub and buzz refers to a loudspeaker test that can detect the presence of higher frequency harmonic products produced in response to a low-frequency stimulus. The test is effective at finding a range of loudspeaker defects, including rubbing due to misalignment, loose particles, missing glue, and torn or ripped cones and surrounds. According to aspects of the embodiments, the result of analyzing the output of each of the microphones is to generate the initial audio performance level (IAPL). The IAPL can include quantitative values such as, for example signal level in decibels (dB), total harmonic distortion (THD) in dB, or percent, among other criteria, or calculating time domain or frequency domain plots from the signals to generate a frequency response or a rub/buzz masks.

In method decision step 610, method 600 stores the IAPL.

In method step 612, method 600 turns on the AEC in CRUT 114, and stimulus signals can be played to verify that the output from each loudspeaker (i.e., the "echo" signal) is adequately cancelled/suppressed from each microphone. This is accomplished by measuring the level of the AEC processed mic signal; according to aspects of the embodiments, the mic output signal should be silent or substantially silent.

Attention is now directed to FIG. 3, which illustrates a flow chart of method 300 for performing sound quality testing of audio equipment located in a conference room according to aspects of the embodiments. According to aspects of the embodiments, one example of a test sequence of such a microphone/loudspeaker configuration is shown in FIG. 3 as method 300, and can include the following steps.

Conference room performance test method 300 (method 300) begins with method step 302 in which it is determined that CRUT 114 should have its current audio performance level (CAPL) determined. It could be that such testing is done periodically, or perhaps one or more pieces of audio equipment have begun to show or exhibit problems in usage. Such problems can occur after a period of time, and it is determined that the equipment in the conference room (CRUT 114) needs to be re-calibrated and/or equipment has failed and needs to be repaired and replaced, and then the audio equipment needs to be re-calibrated. As with the determination of the IAPL, the CAPL can include one or more audio equipment tests that can determine quantitative values such as, for example signal level in decibels (dB), total harmonic distortion (THD) in dB, or percent, among other criteria, or calculating time domain or frequency domain plots from the signals to generate a frequency response or a rub/buzz masks. According to aspects of the embodiments, the tests of the CAPL should match those of the IAPL so that a direct comparison can be made.

In method step 302 the AEC in CRUT 114 is disabled so that the loudspeaker signal is not removed from the microphone output signal.

Next, in method step 304, a stimulus signal is generated by the DSP or some other device, and transmitted to the one or more loudspeakers individually, in a predetermined sequence. The stimulus signal can be one or more of a frequency sweep signal, a pink noise signal, a voice recording, or the like, among others. More than one type of stimulus signal can be used.

In method step 306, the loudspeaker acoustic output signal is received at each of one or more microphones, and the output from each microphone is analyzed. Such analysis can include, but is not limited to one or more attributes such as signal level, frequency response, distortion, rub and buzz, among others. As those of skill in the art can appreciate, rub and buzz refers to a loudspeaker test that can detect the presence of higher frequency harmonic products produced in response to a low-frequency stimulus. The test is effective at finding a range of loudspeaker defects, including rubbing due to misalignment, loose particles, missing glue, and torn or ripped cones and surrounds. According to aspects of the embodiments, the result of analyzing the output of each of the microphones is to generate a current audio performance level (CAPL). The CAPL can include the same measurements as the IAPL, including quantitative values such as, for example signal level in decibels (dB), total harmonic distortion (THD) in dB, or percent, among other criteria, or calculating time domain or frequency domain plots from the signals to generate a frequency response or a rub/buzz masks.

In method decision step 308, method 300 determines whether the performance of CRUT 114 passes or fails certain preset and predetermined criteria. That is, method 300 compares the CAPL of CRUT 114 to the IAPL of CRUT 114; if the CAPL of CRUT 114 is the same or greater than the IAPL of CRUT 114, CRUT 114 passes, meaning that its current audio performance is at least adequate. According to aspects of the embodiments, in comparing the CAPL to the IAPL, method 300 can include a tolerance level (e.g., 1% degradation in the IAPL, or 5% or some other value), such that if the CAPL of CRUT 114 is within 1%, or 5% of the IAPL of CRUT 114, then the audio performance of CRUT 114 is deemed at least adequate, and the test passes. As described above, the performance attributes can include one or more of quantitative values such as, for example signal level in decibels (dB), total harmonic distortion (THD) in dB, or percent, among other criteria, or time domain or frequency domain plots from the signals.

If CRUT 114 passes, then method 300 proceeds to method step 312 ("Pass" path from decision step 308), which is discussed in greater detail below.

If a failure mode exists ("Fail" path from decision step 308), various combinations of failure mode diagnostic checks can be performed to determine and isolate the source of problems (method step 310). According to aspects of the embodiments, such failure modes can include a determination that one or more of the microphones were moved, damaged, or were covered in regard to the initial commissioning of CRUT 114. If it is the case that such problems exist in regard to the one or more microphones, then that microphone will have a degraded signal while others do not. A failed microphone can be a damaged device, or some other component or processing function related to the microphone that is not working or not working properly. Alternatively, or in addition to the possible problems with one or more of the microphones, the audio tests can further ascertain whether one or more of the loudspeakers were damaged; if this occurs, then all microphones will receive a degraded signal from that loudspeaker, while when other loudspeakers are tested, the results will be or can be better.

According to aspects of the embodiments, determining whether one or more microphones have been moved relative to the commissioning of the conference room under test 114 can be ascertained by the systems and methods described herein, and according to one or more methods. To determine if a microphone was moved, the relative output level of each microphone to each loudspeaker can be checked to determine if a microphone was moved and to approximately where (i.e., if the microphone output signal level went down, then in all likelihood it was probably moved, and most likely farther away). According to further aspects of the embodiments, checking the microphone output signal level can determine if new locations of the mics provide adequate coverage for the room/locations. As those of skill in the art can appreciate, the sound level measured from a loudspeaker output falls off the farther away from the loudspeaker the listener or listening device is located. Those of skill in the art can further appreciate that the distance from a loudspeaker to a microphone can be approximated by using the inverse square law of the amplitude of audio received. That is, the sound pressure level (SPL) decreases with doubling of the distance by about −6 dB.

In addition, time domain measurements can also be used to determine distance and location of the microphones. According to further aspects of the embodiments, a time domain measurement can also be used to measure the delay from each loudspeaker to each microphone to assist in selecting optimal microphone locations. By using at least three loudspeakers, a fairly approximate distance/location of the microphone can be determined by generating a test signal from one or more loudspeakers, noting the time of transmission, noting the time of reception by the microphone, and calculating a delta time of travel of the audio signal. The distance from the loudspeaker to the microphone can be readily calculated. As those of skill in the art, such calculation provides a relative distance along a circle of radius r, where r is the distance determined by the simple equation $$r=v\times t$$

where v is the speed of sound in air, and t is the measured time from transmission to reception. The distance of the microphone from each loudspeaker can be obtained, (i.e., for the first loudspeaker a first radius can be obtained, and second radius from the second loudspeaker, and a third radius from the third loudspeaker, and then the intersection of the three radii is determined to find the position of the microphone relative to the three (or more) loudspeakers. According to further aspects of the embodiments, both the relative distance of the microphone to any one loudspeaker and location information of the microphone can be more accurately determined if the installer provides at least one measurement during the initial install (e.g., loudspeaker 1 is 8 feet from mic 1, and repeat the measurements for other loudspeaker-microphone pairs). This helps calibrate the system variables like speaker efficiency, system delays, among other attributes. Subsequently, if in the future someone moved all the portable microphones to one side of the room, testing the system can determine that it is not ready for the next day's audio conference. According to further aspects of the embodiments, the placements of the one or more microphones can be determined to be optimal or suboptimal based on tests such as the ones described herein. Furthermore, threshold measurements can be defined by the installer, and the systems and methods described herein can also indicate when someone has moved the microphones since the last test or since the install.

Following method step 310, method 300 returns to method step 304 and begins the test procedure again by generating stimulus signals as described above (steps 304, 306, 308); the process is repeated until a "pass" condition is achieved in method step 308, in which case method 300 proceeds to method step 312.

In method step 312, the AEC can be turned back on in CRUT 114, and stimulus signals can be played to verify that the output from each loudspeaker (i.e., the "echo" signal) is adequately cancelled/suppressed from each microphone. This is accomplished by measuring the level of the AEC processed mic signal; according to aspects of the embodiments, the mic output signal should be silent or substantially silent. If CRUT 114 passes, method 300 proceeds to method step 314 ("Pass" path from decision step 312), in which CRUT 114 is now set to perform at/above commissioning or initial audio performance levels. If, however, CRUT 114 fails the performance tests, method 300 returns to step 301, and the AEC is disabled in CRUT 114, and steps 304-310 are repeated until CRUT 114 does pass (both steps 308 and 312) or an operator intervenes to stop testing or check the audio equipment under test (e.g., the operator can swap out equipment and run method 300 again from step 302). The performing of steps 304-310 can help ascertain isolate problematic components.

According to further aspects of the embodiments, the processing can be performed within a smart microphone (i.e., one with a built-in DSP), a DSP device, or in the cloud by transmitting the raw microphone signals for remote processing at a remotely located server, among other methods of processing.

According to aspects of the embodiments, the Room Monitor System and Service can check the conference room networked system to determine when it is performing as expected or when there is a problem. The Room Monitor System and Service can provide a Quality of Experience (QoE) rating on a scale of 1 to 10 (or some other scale) with 10 representing optimal results. Users of the Room Monitor System and Service can configure an alert trigger that engages when the desired QoE rating is met, or when the QoE degrades to such level. The Room Monitor System and Service can execute a test suite on the installed DSP system to identify any local points of audio failure that precludes successful system use—i.e., the QoE rating is below the desired threshold.

According to aspects of the embodiments, the Room Monitor System and Service can confirm that one or more microphone element(s) input to the DSP are operational and at expected levels.

According to aspects of the embodiments, the Room Monitor System and Service can verify the internal DSP audio path, from initial input to final output.

According to aspects of the embodiments, the Room Monitor System and Service can confirm an analog output from one or more amplifiers is active, and can verify playback of the same analog output from one or more loudspeakers.

According to aspects of the embodiments, the Room Monitor System and Service can use a DSP based audio source with a predefined configuration that can be invoked for the one or more tests that can be performed. According to aspects of the embodiments, successful sensing of the source audio through the system validates integrity of the signal path.

According to aspects of the embodiments, playback of the source within predefined limits verifies that current performance levels of the system are substantially similar to the accepted performance levels at the time of commissioning with the same configuration parameters. The accepted performance levels at the time of commissioning of the conference room can be referred to as the "room signature." According to aspects of the embodiments, the Room Monitor System and Service can use Creston's XiO® cloud service can initiate the test, collect the data that is generated, and report the results of the test with data that can be included in one or more notifications sent to predefined personnel. According to aspects of the embodiments, the Room Monitor System and Service can also maintain a log and display the historical results for the user to review and analyze in regard to identifying precipitating conditions contributing to a change in results.

According to aspects of the embodiments, the Room Monitor System and Service can verify the audio integrity of one or more network conference rooms.

According to aspects of the embodiments, the Room Monitor System and Service can provide a system and method for saving the acoustic signature of the room as the testing reference (i.e., the "room signature").

According to aspects of the embodiments, the Room Monitor System and Service can provide a system and method for making and managing in-room measurements on the DSP.

According to aspects of the embodiments, the Room Monitor System and Service can provide a system and method for detecting issues within the system and ideally identifying the location of the issue.

According to aspects of the embodiments, the Room Monitor System and Service can provide a system and method for generating a single score representing the room conditions, the score referred to as a "conference room audio integrity rating" (or "Quality of Service" ("QoS") rating).

According to aspects of the embodiments, the Room Monitor System and Service can provide a system and method for executing the service through the XiO cloud including kickoff, data collection and analysis, push notifications, and historical log view, among other actions and services.

Figure 4:
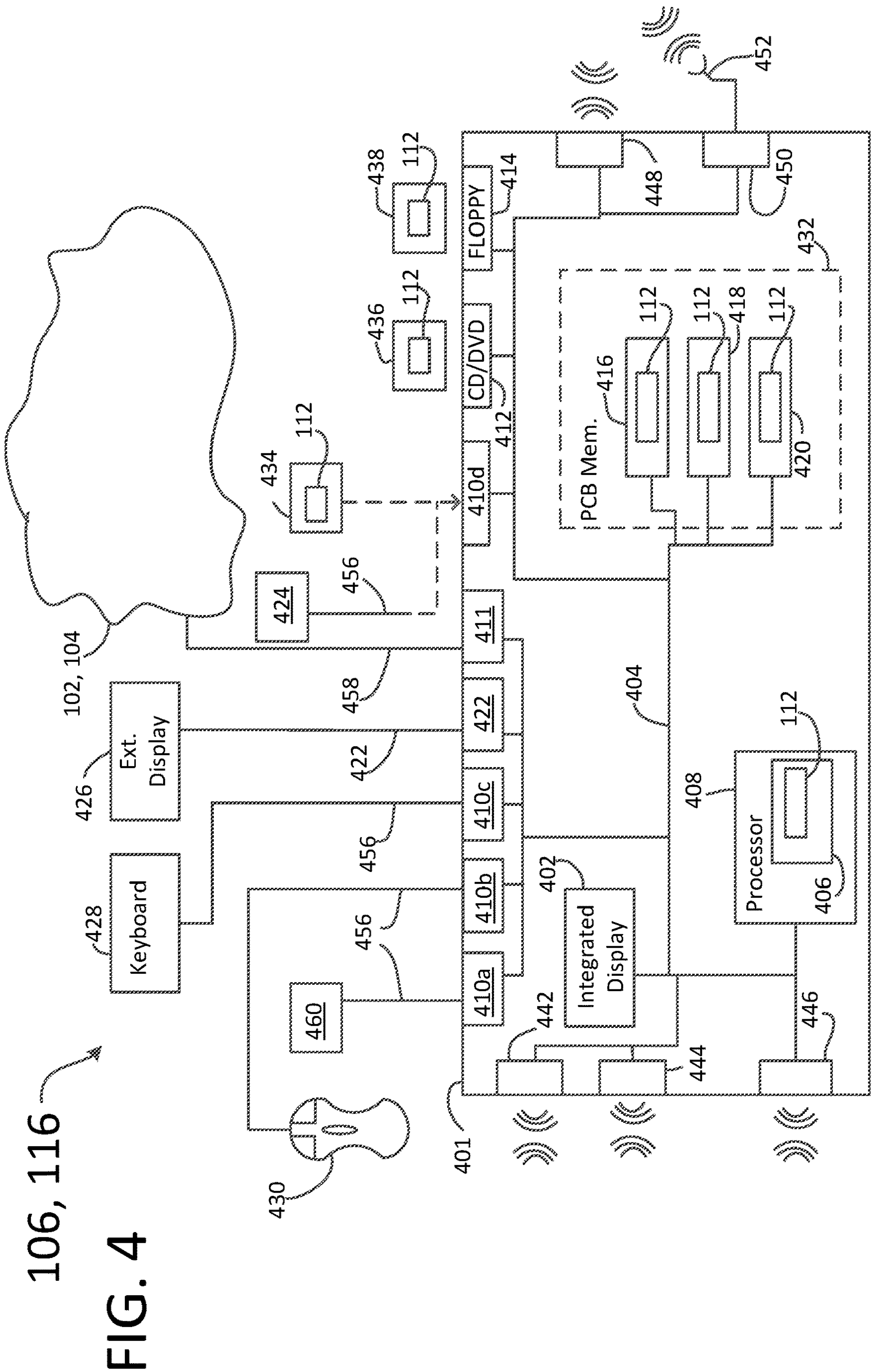
FIG. 4 illustrates a functional block diagram of personal computer/processor/laptop/server or audio equipment (herein after, "processor") suitable for use to implement the method shown in FIG. 3 for performing testing of the audio equipment in one or more conference rooms either through one or more networks and/or cloud computing according to aspects of the embodiments.

FIG. 4 illustrates a functional block diagram of personal computer/processor/laptop/server 106 or audio equipment 116 (herein after, "processor 106") suitable for use to implement method 300 shown in FIG. 3 for performing testing of audio equipment 116 in one or more conference rooms 114 either through one or more networks and/or cloud computing according to aspects of the embodiments. Processor 106 comprises, among other items, shell/box 401, integrated display/touch-screen 402 (though not used in every application of processor 106), internal data/command bus (bus) 404, processor board/processor internal memory (internal memory) 432, and one or more processors 408 with processor internal memory 406 (which can be typically read only memory (ROM) and/or random access memory (RAM)). Those of ordinary skill in the art can appreciate that in modern processor systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. Processor 106 further comprises multiple input/output ports, such as universal serial bus ports 410, Ethernet ports 411, and video graphics array (VGA) ports/high definition multimedia interface (HDMI) ports 422, among other types. Further, processor 106 includes externally accessible drives such as compact disk (CD)/digital video disk (DVD) read/write (RW) (CD/DVD/RW) drive 412, and floppy diskette drive 414 (though less used currently, many PCs still include this device). Processor 106 still further includes wireless communication apparatus, such as one or more of the following: Wi-Fi transceiver 442, BlueTooth (BT) transceiver 444, near field communications (NFC) transceiver 446, third generation (3G)/fourth Generation (4G)/fifth Generation (5G)/long term evolution (LTE) (3G/4G/LTE) transceiver 448, communications satellite/global positioning system (satellite) transceiver device 450, and antenna 452.

Internal memory 432 itself can comprise hard disk drive (HDD) 416 (these can include conventional magnetic storage media, but, as is becoming increasingly more prevalent, can include flash drive memory 434, among other types), read-only memory (ROM) 418 (these can include electrically erasable (EE) programmable ROM (EEPROMs), ultraviolet erasable Proms (UVPROMs), among other types), and random access memory (RAM) 420. Usable with USB port 410*d* is flash drive memory 434, and usable with CD/DVD/RW drive 412 are CD/DVD disks 436 (which can be both read and write-able). Usable with floppy diskette drive 414 are floppy diskettes 438. External memory storage 406 can be used to store data and programs external to box 401 of processor 106, and can itself comprise another hard disk drive 416*a*, flash drive memory 434, among other types of memory storage. External memory storage 406 is connectable to processor 106 via USB cable 456. Each of the memory storage devices, or the memory storage media (406, 416, 418, 420, 406, 434, 436, and 438, among others), can contain parts or components, or in its entirety, executable software programming code or application (application, or "App") 112, which can implement part or all of the portions of method 300 described herein.

In addition to the above described components, processor 106 also comprises keyboard 428, external display 426, printer/scanner/fax machine 460, and mouse 430 (although not technically part of processor 106, the peripheral components as shown in FIGS. 4 (422, 406, 426, 428, 430, 434, 436, 438, 456, 458, and 460) are so well known and adapted for use with processor 106 that for purposes of this discussion they shall be considered as being part of processor 106). Other cable types that can be used with processor 106 include RS 232, among others, not shown, that can be used for one or more of the connections between processor 106 and the peripheral components described herein. Keyboard 428, mouse 430, and printer/scanner/fax machine 460 are connectable to processor 106 via USB cable 56, and external display 426 is connectible to processor 106 via VGA cable/HDMI cable 422. Processor 106 is connectible to internet 454 via Ethernet port 411 and Ethernet cable 458 via a router and modulator-demodulator (MODEM), neither of which are shown in FIG. 4. All of the immediately aforementioned components (422, 406, 426, 428, 430, 434, 436, 438, 456, 458, and 460) are known to those of ordinary skill in the art, and this description includes all known and future variants of these types of devices.

External display 426 can be any type of known display or presentation screen, such as liquid crystal displays (LCDs), light emitting diode displays (LEDs), plasma displays, cathode ray tubes (CRTs), among others. In addition to the user interface mechanism such as mouse 430, processor 106 can further include a microphone, touch pad, joystick, touch screen, voice-recognition system, among other inter-active inter-communicative devices/programs, which can be used to enter data and voice, and which all of are known to those of skill in the art and thus a detailed discussion thereof has been omitted in fulfillment of the dual purposes of clarity and brevity.

As mentioned above, processor 106 further comprises a plurality of wireless transceiver devices, such as Wi-Fi transceiver 442, BT transceiver 444, NFC transceiver 446, 3G/4G/5G/LTE transceiver 448, satellite transceiver device 450, and antenna 452. While each of Wi-Fi transceiver 442, BT transceiver 444, NFC transceiver 446, 3G/4G/5G/LTE transceiver 448, and satellite transceiver device 450 has their own specialized functions, each can also be used for other types of communications, such as accessing a cellular service provider (not shown), accessing internet 454, texting, emailing, among other types of communications and data/voice transfers/exchanges, as known to those of skill in the art. Each of Wi-Fi transceiver 442, BT transceiver 444, NFC transceiver 446, 3G/4G/5G/LTE transceiver 448, satellite transceiver device 450 includes a transmitting and receiving device, and a specialized antenna, although in some instances, one antenna can be shared by one or more of Wi-Fi transceiver 442, BT transceiver 444, NFC transceiver 446, 3G/4G/5G/LTE transceiver 448, and satellite transceiver device 450. Alternatively, one or more of Wi-Fi transceiver 442, BT transceiver 444, NFC transceiver 446, 3G/4G/5G/LTE transceiver 448, and satellite transceiver device 450 will have a specialized antenna, such as satellite transceiver device 450 to which is electrically connected at least one antenna 452.

In addition, processor 106 can access network 122, either through a hard wired connection such as Ethernet port 411 as described above, or wirelessly via Wi-Fi transceiver 442, 3G/4G/5G/LTE transceiver 448 and/or satellite transceiver 450 (and their respective antennas) according to an embodiment. Processor 106 can also be part of a larger network configuration as in a global area network (GAN) (e.g., the internet), which ultimately allows connection to various landlines.

According to further embodiments, integrated touch screen display 402, keyboard 428, mouse 430, and external display 426 (if in the form of a touch screen), can provide a means for a user to enter commands, data, digital, and analog information into processor 106. Integrated and external displays 402, 426 can be used to show visual representations of acquired data, and the status of applications that can be running, among other things.

Bus 404 provides a data/command pathway for items such as: the transfer and storage of data/commands between processor 408, Wi-Fi transceiver 442, BT transceiver 444, NFC transceiver 446, 3G/4G/5G/LTE transceiver 448, satellite transceiver device 450, integrated display 402, USB port 410, Ethernet port 411, VGA/HDMI port 422, CD/DVD/RW drive 412, floppy diskette drive 414, and internal memory 432. Through bus 404, data can be accessed that is stored in internal memory 432. Processor 408 can send information for visual display to either or both of integrated and external displays 402, 426, and the user can send commands to system operating programs/software/Apps 126 that might reside in processor internal memory

406 of processor 408, or any of the other memory devices (436, 438, 416, 418, and 420).

Processor 106, and either processor internal memory 406 or internal memory 432, can be used to implement method 300 for performing testing of audio equipment 116 in conference room 114 according to aspects of the embodiments. Hardware, firmware, software, or a combination thereof may be used to perform the various steps and operations described herein. According to an embodiment, App 126 for carrying out the above discussed steps can be stored and distributed on multi-media storage devices such as devices 416, 418, 420, 434, 436 and/or 438 (described above) or other form of media capable of portably storing information. Storage media 434, 436 and/or 438 can be inserted into, and read by devices such as USB port 410, CD/DVD/RW drive 412, and disk drives 414, respectively.

As also will be appreciated by one skilled in the art, the various functional aspects of the embodiments may be embodied in a wireless communication device, a telecommunication network, or as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information, and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired, or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

Figure 5:
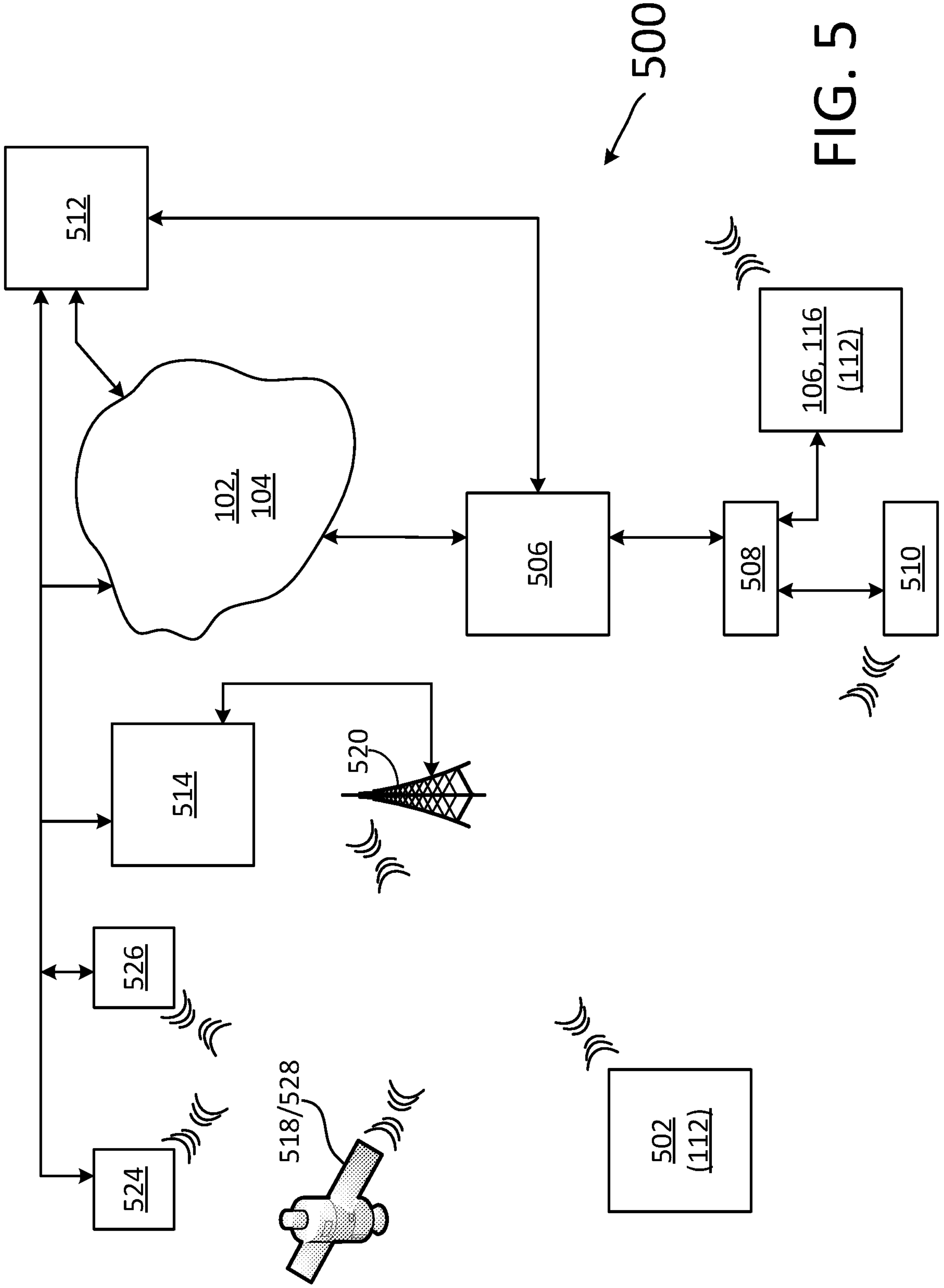
FIG. 5 illustrates a network system within which the system and method for performing testing of audio equipment in one or more conference rooms either through one or more networks and/or cloud computing can be implemented according to aspects of the embodiments.

FIG. 5 illustrates network system 500 within which the system and method for performing testing of audio equipment 116 in one or more conference rooms 114 either through one or more networks and/or cloud computing can be implemented according to aspects of the embodiments. Much of the network system infrastructure shown in FIG. 5 is or should be known to those of skill in the art, so, in fulfillment of the dual purposes of clarity and brevity, a detailed discussion thereof shall be omitted.

According to an embodiment, a user of the system and method for performing testing of audio equipment 116 in one or more conference rooms 114 either through one or more networks and/or cloud computing would have room monitor App 112 on their mobile device 502 and server 106 and audio equipment 116. Mobile devices 502 can include, but are not limited to, so-called smart phones, tablets, personal digital assistants, notebook, and laptop computers, and essentially any device that can access the internet and/or cellular phone service or can facilitate transfer of the same type of data in either a wired or wireless manner. For purposes of this discussion, however, the user shall be discussed as using only server 106 though such discussion should be understood to be in a non-limiting manner in view of the discussion above about the other types of devices that can access, use, and provide such information.

Mobile device 502 can access cellular service provider 514, either through a wireless connection (cellular tower 520) or via a wireless/wired interconnection (a "Wi-Fi" system that comprises, e.g., modulator/demodulator (modem) 508, wireless router 510, server 106, internet service provider (ISP) 506, and internet 102, 104. Further, mobile device 502 can include near field communication (NFC), "Wi-Fi," and Bluetooth (BT) communications capabilities as well, all of which are known to those of skill in the art. To that end, network system 500 further includes, as most enterprise locations do, one or more servers 106 that can be connected to wireless router 510 via a wired connection (e.g., modem 508) or via a wireless connection (e.g., Bluetooth). Modem 508 can be connected to ISP 506 to provide internet based communications in the appropriate format to end users (e.g., server 106), and which takes signals from the end users and forwards them to ISP 506. Such communication pathways are well known and understand by those of skill in the art, and a further detailed discussion thereof is therefore unnecessary.

Mobile device 502 can also access global positioning system (GPS) satellite 528, which is controlled by GPS station 524, to obtain positioning information (which can be useful for different aspects of the embodiments), or mobile device 502 can obtain positioning information via cellular service provider 514 using cell tower(s) 520 according to one or more well-known methods of position determination. Some mobile devices 502 can also access communication satellites 518 and their respective satellite communication systems control stations 526 (the satellite in FIG. 5 is shown common to both communications and GPS functions) for near-universal communications capabilities, albeit at a much higher cost than convention "terrestrial" cellular services. Mobile device 502 can also obtain positioning information when near or internal to a building (or arena/stadium) through the use of one or more of NFC/BT devices, the details of which are known to those of skill in the art. FIG. 5 also illustrates other components of network system 500 such as plain old telephone service (POTS) provider 512.

According to further aspects of the embodiments, network system 500 also contains server 106, wherein one or more processors, using known and understood technology, such as memory, data and instruction buses, and other electronic devices, can store and implement code that can implement the system and method for performing testing of audio equipment 116 in one or more conference rooms 114 either through one or more networks and/or cloud computing according to aspects of the embodiments.

INDUSTRIAL APPLICABILITY

To solve the aforementioned problems, the aspects of the embodiments are directed towards systems, methods, and modes for a cloud based monitoring service for network-connected equipment in a conference room. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A computer-implemented method for performing sound quality testing of audio equipment in a conference room, the method executed by one or more processors, comprising:

(a) determining, at a time t1, in a conference room with a set of audio video equipment, the set of audio equipment comprising one or more loudspeakers, one or more microphones, and audio signal processing equipment that includes at least an acoustic echo cancellation function, an initial audio performance level (IAPL) with the acoustic echo cancellation function turned off, and storing the same;

(b) determining, at a second time t2, following the first point in time t1, a current audio performance level (CAPL) with the acoustic echo cancellation function turned off, and storing the same;

(c) comparing the CAPL to the IAPL; and (d) determining if the audio equipment in the conference room passes or fails the sound quality test based on the comparison of the CAPL to the IAPL.

2. The method according to claim 1, wherein the steps of determining the IAPL and the CAPL, comprise:

(e) disabling the acoustic echo cancellation function in the audio equipment of the conference room such that an output from each of the one or more loudspeakers is not removed from a respective microphone output signal;

(f) generating an electrical stimulus test signal and transmitting it to the one or more loudspeakers in the audio equipment of the conference room; and (g) receiving an acoustic audio stimulus test signal generated by each of the one or more loudspeakers from each of the one or more microphones, and analyzing each of the received acoustic audio stimulus test signals to generate a current audio performance level (CAPL).

3. The method according to claim 2, further comprising:

(h) performing one or more microphone and/or loudspeaker failure mode diagnostic checks if the audio equipment fails the sound quality test to determine if one or more microphones has degraded in performance, one or more loudspeakers has degraded in performance, or whether one or more of both microphones and loudspeakers has degraded in performance.

4. The method according to claim 3, further comprising:

performing steps (e)-(h) until the comparison of the CAPL and IAPL indicates a pass of the sound quality test.

5. The method according to claim 3, wherein the step of performing one or more microphone and/or loudspeaker failure more diagnostic checks comprises:

determining that one or more of the one or more microphones were moved, damaged and/or covered in regard to initial commissioning, and/or determining that one or more of the one or more loudspeakers were damaged in regard to the initial commissioning.

6. The method according to claim 5, wherein the step of determining that one or more of the one or more microphones were moved in regard to initial commissioning comprises:

determining a relative output level of the microphone, such that a decreased relative output level of the microphone indicates movement away from the one or more loudspeakers, and an increased relative output level indicates movement towards the one or more loudspeakers.

7. The method according to claim 5, wherein the step of determining that one or more of the one or more microphones were moved in regard to initial commissioning comprises:

using time domain measurements to measure delay between each of the one or more loudspeakers and each of the one or more microphones.

8. The method according to claim 7, wherein the step of using time domain measurement comprises:

transmitting an acoustic test signal from each of at least three loudspeakers one at a time to at least one microphone under test, noting a start time of transmission from each of the at least three loudspeakers, a corresponding receive time at the microphone under test, and determining a position according to the equation $r=v\times t$, wherein r=radius from a respective loudspeaker, v=a velocity of sound, and t=a time of transmission of the acoustic test signal, and further wherein an intersection of the three radii can be determined to ascertain a relative location of the microphone under test relative to the at least three loudspeakers.

9. The method according to claim 2, further comprising:

(h) enabling the acoustic echo cancellation function in the audio equipment in the conference room if the comparison between the CAPL and IAPL indicates a pass of the sound quality test; and performing steps (e)-(g) until a subsequent comparison of the CAPL and IAPL indicates a pass of the sound quality test, wherein the audio equipment is determined to be performing at or above the IAPL.

10. The method according to claim 2, wherein the electrical stimulus test signal consists of at least one of a frequency sweep signal a pink noise signal, a voice recording, or any combination of a frequency sweep signal a pink noise signal, and a voice recording.

11. The method according to claim 2, wherein the step of analyzing consists of one or more of (a) determining quantitative values of the received acoustic audio stimulus test signals from each of the one or more microphones, wherein such quantitative values can include signal levels in decibels (dB) or percentage, or total harmonic distortion (THD) in dB or percentage, or (b) determining time domain or frequency domain plots of the received acoustic audio stimulus test signals from each of the one or more microphones.

12. The method according to claim 1, wherein the step of determining if the audio equipment in the conference room passes or fails the sound quality test based on the comparison of the CAPL to the IAPL comprises:

passing the sound quality test if the CAPL is the same or better than the IAPL, and alternatively, failing the sound quality test if the CAPL is worse than the IAPL.

13. The method according to claim 1, wherein the step of determining if the audio equipment in the conference room passes or fails the sound quality test based on the comparison of the CAPL to the IAPL comprises:

passing the sound quality test if the CAPL is at or within a first tolerance level of the IAPL, and alternatively, failing the sound quality test if the CAPL is greater than the first tolerance level of the IAPL.

14. The method according to claim 1, wherein the step of determining an IAPL comprises:

installing the audio equipment in the conference room;

tuning the audio equipment in the conference room;

disabling the acoustic echo cancellation function in the audio equipment of the conference room such that an output from each of the one or more loudspeakers is not removed from a respective microphone output signal;

generating an electrical stimulus test signal and transmitting it to the one or more loudspeakers in the audio equipment of the conference room; and receiving an acoustic audio stimulus test signal generated by each of the one or more loudspeakers from each of the one or more microphones, and analyzing each of the received acoustic audio stimulus test signals to generate the IAPL.

15. The method according to claim 14, wherein the step of tuning comprises:

adjusting the audio equipment within conference room until a substantially flat frequency response is achieved in response to one or more test signals; and obtaining substantially uniform audio signal coverage throughout the usable area of the conference room.

16. A system for performing sound quality testing of audio equipment in a conference room comprising:

a set of audio equipment located in a conference room, the set of audio equipment comprising one or more loudspeakers, one or more microphones, and audio signal processing equipment that includes at least an acoustic echo cancellation function, and wherein the audio signal processing equipment is adapted to communicate via a network interface;

at least one processor communicatively coupled to the audio signal processing equipment via the network interface; and a memory operatively connected with the at least one processor, wherein the memory stores computer-executable instructions that, when executed by the at least one processor, causes the at least one processor to execute a method that comprises:

(a) determining, at a time t1, in a conference room with a set of audio video equipment, the set of audio equipment comprising one or more loudspeakers, one or more microphones, and audio signal processing equipment that includes at least an acoustic echo cancellation function, an initial audio performance level (IAPL) with the acoustic echo cancellation function turned off, and storing the same;

(b) determining, at a second time t2, following the first point in time t1, a current audio performance level (CAPL) with the acoustic echo cancellation function turned off, and storing the same;

(c) comparing the CAPL to the IAPL; and (d) determining if the audio equipment in the conference room passes or fails the sound quality test based on the comparison of the CAPL to the IAPL.

17. The system according to claim 16, wherein the method steps of determining the IAPL and the CAPL, comprise:

(e) disabling the acoustic echo cancellation function in the audio equipment of the conference room such that an output from each of the one or more loudspeakers is not removed from a respective microphone output signal;

(f) generating an electrical stimulus test signal and transmitting it to the one or more loudspeakers in the audio equipment of the conference room; and (g) receiving an acoustic audio stimulus test signal generated by each of the one or more loudspeakers from each of the one or more microphones, and analyzing each of the received acoustic audio stimulus test signals to generate a current audio performance level (CAPL).

18. The system according to claim 17, wherein the method further comprises:

(h) performing one or more microphone and/or loudspeaker failure mode diagnostic checks if the audio equipment fails the sound quality test to determine if one or more microphones has degraded in performance, one or more loudspeakers has degraded in performance, or whether one or more of both microphones and loudspeakers has degraded in performance.

19. The system according to claim 18, wherein the method, further comprises:

performing steps (e)-(h) until the comparison of the CAPL and IAPL indicates a pass of the sound quality test.

20. The system according to claim 18, wherein the method step of performing one or more microphone and/or loudspeaker failure more diagnostic checks comprises:

determining that one or more of the one or more microphones were moved, damaged and/or covered in regard to initial commissioning, and/or determining that one or more of the one or more loudspeakers were damaged in regard to the initial commissioning.

21. The system according to claim 20, wherein the method step of determining that one or more of the one or more microphones were moved in regard to initial commissioning comprises:

determining a relative output level of the microphone, such that a decreased relative output level of the microphone indicates movement away from the one or more loudspeakers, and an increased relative output level indicates movement towards the one or more loudspeakers.

22. The system according to claim 20, wherein the method step of determining that one or more of the one or more microphones were moved in regard to initial commissioning comprises:

using time domain measurements to measure delay between each of the one or more loudspeakers and each of the one or more microphones.

23. The system according to claim 22, wherein method step of using time domain measurement comprises:

transmitting an acoustic test signal from each of at least three loudspeakers one at a time to at least one microphone under test, noting a start time of transmission from each of the at least three loudspeakers, a corresponding receive time at the microphone under test, and determining a position according to the equation $r=v\times t$, wherein r=radius from a respective loudspeaker, v=a velocity of sound, and t=a time of transmission of the acoustic test signal, and further wherein an intersection of the three radii can be determined to ascertain a relative location of the microphone under test relative to the at least three loudspeakers.

24. The system according to claim 17, wherein the method further comprises:

(h) enabling the acoustic echo cancellation function in the audio equipment in the conference room if the comparison between the CAPL and IAPL indicates a pass of the sound quality test; and performing steps (e)-(g) until a subsequent comparison of the CAPL and IAPL indicates a pass of the sound quality test, wherein the audio equipment is determined to be performing at or above the IAPL.

25. The system according to claim 17, wherein the electrical stimulus test signal consists of at least one of a frequency sweep signal a pink noise signal, a voice recording, or any combination of a frequency sweep signal a pink noise signal, and a voice recording.

26. The system according to claim 17, wherein the method step of analyzing consists of one or more of (a) determining quantitative values of the received acoustic audio stimulus test signals from each of the one or more microphones, wherein such quantitative values can include signal levels in decibels (dB) or percentage, or total harmonic distortion (THD) in dB or percentage, or (b) determining time domain or frequency domain plots of the received acoustic audio stimulus test signals from each of the one or more microphones.

27. The system according to claim 16, wherein the method step of determining if the audio equipment in the conference room passes or fails the sound quality test based on the comparison of the CAPL to the IAPL comprises:

passing the sound quality test if the CAPL is the same or better than the IAPL, and alternatively, failing the sound quality test if the CAPL is worse than the IAPL.

28. The system according to claim 16, wherein the method step of determining if the audio equipment in the conference room passes or fails the sound quality test based on the comparison of the CAPL to the IAPL comprises:

passing the sound quality test if the CAPL is at or within a first tolerance level of the IAPL, and alternatively, failing the sound quality test if the CAPL is greater than the first tolerance level of the IAPL.

29. The system according to claim 16, wherein the method step of determining an IAPL comprises:

installing the audio equipment in the conference room;

tuning the audio equipment in the conference room;

disabling the acoustic echo cancellation function in the audio equipment of the conference room such that an output from each of the one or more loudspeakers is not removed from a respective microphone output signal;

generating an electrical stimulus test signal and transmitting it to the one or more loudspeakers in the audio equipment of the conference room; and receiving an acoustic audio stimulus test signal generated by each of the one or more loudspeakers from each of the one or more microphones, and analyzing each of the received acoustic audio stimulus test signals to generate the IAPL.

30. The system according to claim 29, wherein the method step of tuning comprises: adjusting the audio equipment within conference room until a substantially flat frequency response is achieved in response to one or more test signals; and obtaining substantially uniform audio signal coverage throughout the usable area of the conference room.

* * * * *